US005546673A

United States Patent [19]
Weagraff et al.

[11] Patent Number: 5,546,673
[45] Date of Patent: Aug. 20, 1996

[54] PLASTIC PELLET DRYER CONTROL SYSTEM EQUIPPED WITH A TEMPERATURE PROTECTION DEVICE FOR THE HEATING UNIT

[75] Inventors: Jon J. Weagraff, Titusville; Kaihan Tavakoli, Oil City, both of Pa.

[73] Assignee: The Conair Group, Inc., Pittsburgh, Pa.

[21] Appl. No.: 444,705

[22] Filed: May 19, 1995

[51] Int. Cl.⁶ .................................................. F26B 21/06
[52] U.S. Cl. ............................................. 34/80; 219/481
[58] Field of Search .................... 34/80, 81; 219/481, 219/491; 236/10, 13

[56] References Cited

U.S. PATENT DOCUMENTS

| | | | |
|---|---|---|---|
| 1,533,282 | 6/1922 | Thornton, Jr. | 219/481 |
| 4,413,426 | 11/1983 | Gräff | 34/27 |
| 4,974,337 | 12/1990 | Tavakoli et al. | 34/27 |

Primary Examiner—Henry A. Bennet
Assistant Examiner—Dinnatia Doster
Attorney, Agent, or Firm—Buchanan Ingersoll; George Raynovich, Jr.

[57] ABSTRACT

A dryer control system for controlling the drying of polymer plastic pellets within a dryer hopper is provided. A series of temperature snap switches and pressure switches are strategically located within the dryer control system to cause a variety of passive fault lights to be activated to signal faults while the system continues to operate or to cause an alarm light to be activated which stops the drying cycle. The passive fault lights indicate a situation within the drying cycle which should be corrected but which is not sufficiently serious to stop the drying cycle. An alarm being activated, on the other hand, indicates a situation which requires shutdown of the drying system until the problems which caused the alarm are corrected. A programmable logic controller and a temperature controller control the operation of the system by receiving signals from the snap switches and pressure switches throughout the system.

20 Claims, 6 Drawing Sheets

FIG. 4A     ALARMS

- - Passive - -   Yellow light: Dryer stays running
                         96   (temperature fault)
                         98   (regeneration fault)
                       100  (air flow fault)

- - Active - -   Yellow light in combination with red light or the red light only: Shuts down dryer
                       96   (temperature fault) 102, (alarm)
                       98   (regeneration fault) 102, (alarm)
                       102  (alarm)

| Alarm | Reason | Rationale | Detection Method |
|---|---|---|---|
| Fault Light 96 | High return air temperature | Inadequate regeneration of desiccant<br>- Drying material too long<br>- Hopper (10) not full<br>- Aftercooler (18) needs cleaned<br>- Return air filter (18a) dirty | Temp Snap Switch (19) in process return air line (22) |
| Fault Light 96 and Alarm Light 102 | Exceeding high or low temp limits | Low - Burned out process heater(s) (72)<br>      - Bad relays (70)<br>      - Loose hoses<br>High - Position of temperature probe (38)<br>      - Return air filter (18 (a)) dirty | Temp control (88) |

FIG. 4B    ALARMS

| Alarm | Reason | Rationale | Detection Method |
|---|---|---|---|
| Fault Light 98 | Regeneration fault | Trip too soon — desiccant tank is too low on desiccant<br>Never tripped — desiccant contaminated or regen filter blocked (18(a)) or bad heater (s) (68) or regen blower failed (44) or bad relay (66) | Exhaust temp snap switch (50) located in regeneration air exhaust line |
| Fault Light 98 and Alarm Light 102 | Index carousel did not index | - Bad carousel drive motor (24a)<br>- Index switch 92 is out of alignment | Index limit switch (92) does not change state and back before a set amount of time |
| Fault Light 100 | Reduction of air flow | Return air filter (18a) is clogged | Pressure switch 36 located across aftercooler |
| Fault Light 100 and Alarm Light 102 | Does not exist | Does not exist | Does not exist |
| Alarm Light 102 only | One or both high temp snap switches (51, 40) have closed | Present run away heater condition<br>- Return air filter (18a) is clogged<br>- Bad relays (70) | High temp snap switches (51, 40) located on heater boxes |

PLASTIC PELLET DRYER CONTROL SYSTEM EQUIPPED WITH A TEMPERATURE PROTECTION DEVICE FOR THE HEATING UNIT

BACKGROUND OF THE INVENTION

1. Field of the Invention

This invention relates to a control system to control a dryer utilized for the drying of plastic pellets that are ultimately melted and used to form plastic articles of manufacture. The control system is designed to simplify operation of the pellet dryer and to utilize readily available components to provide a reliable control system.

2. Description of the Prior Art

Dryers and dryer hoppers have been utilized in the plastic industries for many years. These dryers provide heated, dehumidified air to a dryer hopper. Plastic pellets within the dryer hopper are exposed to the heated, dehumidified air to remove moisture from the pellets. The basic purpose of drying the plastic pellets is to remove moisture from the surface and interior of the pellets before the pellets reach the melt phase as they pass through the screw area of an injection or extrusion machine. If the moisture is not removed, process problems may occur or the quality of the finished parts may be inferior to parts which were made with properly dried material. Some properties of the parts which may be affected by inadequate drying are: tensile strength; impact strength; surface blemishes; and degradation of barrier properties.

Moisture may be present either on the surface of the plastic pellet or in the polymer chain itself. Hygroscopic resin absorbs moisture into the polymer chain itself. Other resins hold only surface moisture. Proper heating and dehumidifying of the pellet causes the moisture to be driven out of hygroscopic resins onto the surface. Surface moisture is removed by the heated, dehumidified air.

It is well known in the art to utilize a generally cylindrical dryer hopper having a frusto-conical base to house plastic pellets for drying. The heated and dehumidified air is admitted to the lower portion of the dryer hopper and passes upwardly through the dryer hopper containing the pellets and is removed at the top of the hopper. The air, after having passed through the pellets, contains moisture and is substantially cooler than when it entered the hopper. This cooler, moisture-laden air is then recycled through a process cooler to further cool the air and then passes through a desiccant section where moisture is removed from the air. The air then travels through a process heater where it is heated again to a temperature sufficient to dry the pellets and that air is passed through the dryer hopper. The desiccant section typically contains three or more desiccant tanks containing molecular sieves usually formed of Alumino-silicates which remove the moisture from the air. The desiccant tanks are rotated so that while one is in use, the others are being regenerated to accept moisture and remove it from the air.

Various control systems have been utilized to control the flow of air through the dryer hopper, to control the operation of the desiccant regeneration feature and to control the overall drying of the plastic pellets within the dryer hopper. United States patent 4,413,426 is an example of an effort to control the drying process within a dryer hopper by controlling the temperature of the exhaust air from the hopper.

SUMMARY OF THE INVENTION

In accordance with the present invention, a dryer control system for drying plastic pellets within a dryer hopper is provided. The system has a process heater for heating air to be introduced into the dryer hopper. The process heater box includes a snap switch that closes upon reaching a predetermined high temperature. A temperature probe is positioned to determine the temperature of air entering the dryer hopper. A return air line returns air from the dryer hopper through a filter, a cooler, a motor driven blower, and a desiccant tank to the process heater. Multiple desiccant tanks are provided to permit cooling and regeneration of the desiccant tanks not being utilized to dry process air. A desiccant regeneration heater box for heating air to regenerate the desiccant tanks includes a second snap switch that closes upon reaching a predetermined high temperature. A programmable logic controller and a temperature controller are provided in the system. The temperature probe signals the programmable logic controller and the temperature controller to maintain a preselected temperature of the heated air leaving the process heater box. The first snap switch and the second snap switch each cause the control system to shut-off if either of the snap switches closes.

Accordingly, an object of the present invention is to provide an improved dryer control system for controlling the drying of plastic pellets within a dryer hopper.

Another object of the present invention is to provide a control system which automatically shuts down the system if dangerously high temperatures develop in the process heater box or the regeneration heater box of the system.

Another object of the present invention is to provide a dryer control system that utilizes readily available snap switches, temperature probes and pressure switches to control the operation of the system.

These and other objects of the present invention will become apparent as this description proceeds in conjunction with the accompanying drawings and appended claims.

BRIEF DESCRIPTION OF THE DRAWINGS

FIG. 4 is a chart illustrating various situations which will result in illumination of fault lights and/or the alarm light of the present invention and that may result in shut-down of the system.

DESCRIPTION OF THE PREFERRED EMBODIMENT

Figure 1:
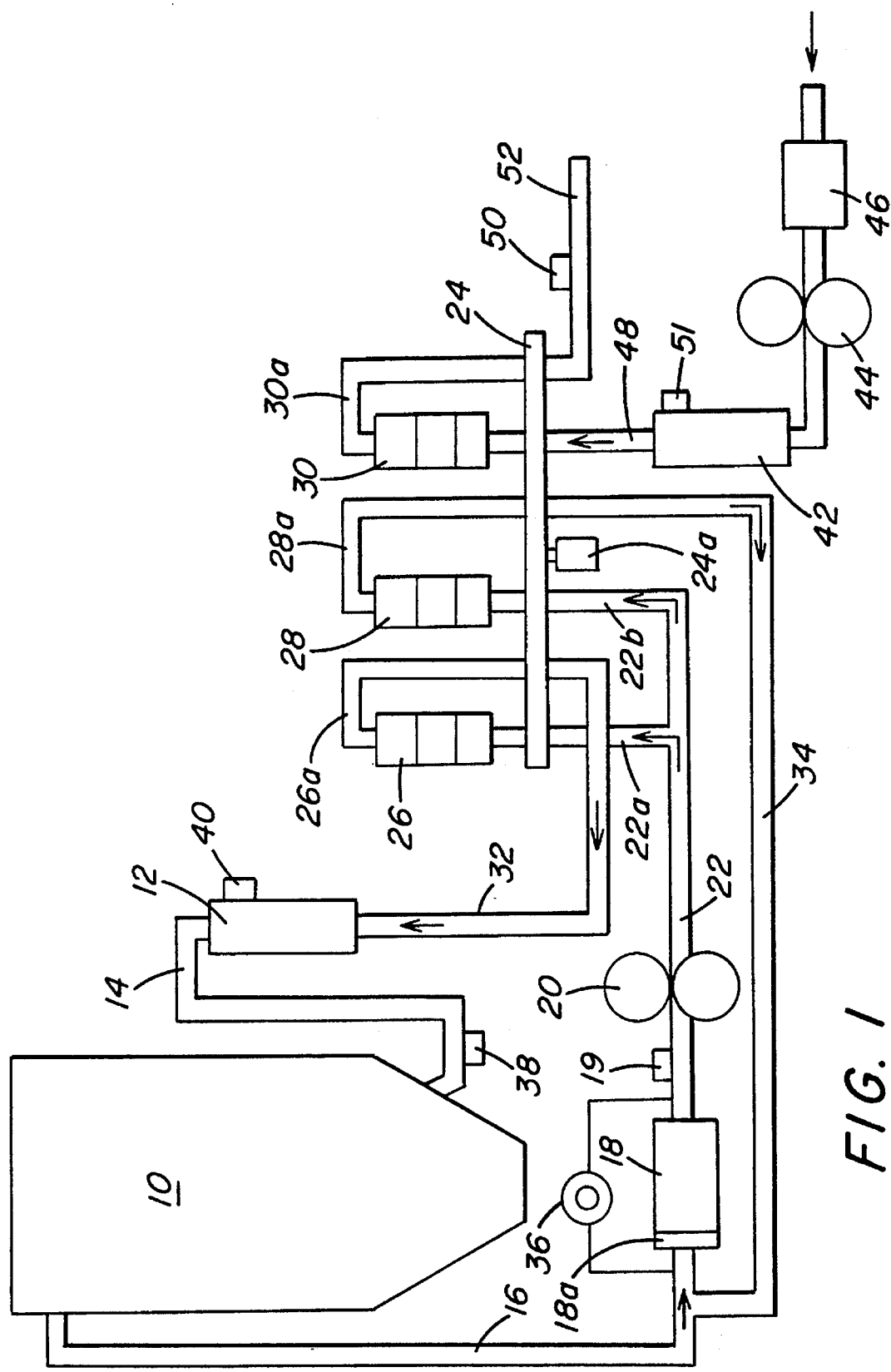
FIG. 1 is a schematic representation of a plastic pellet dryer with the control system of the present invention.

Referring to the drawings and particularly to FIG. 1, there is shown a dryer hopper 10 having a cylindrical body and a frusto-conical lower portion. The process heater box 12 contains process heaters 72 (FIG. 2) which heat air that is conveyed through heated air line 14 to the bottom of the dryer hopper 10. The heated air moves upwardly through plastic pellets (not shown) contained within the dryer hopper 10. An air return line 16 removes air from the top of the dryer hopper 10 after the air has passed through the plastic pellets and collected moisture from them. The air return line 16 moves the air to cooler 18 through a cooler filter 18a located at the end of the cooler. The purpose for the cooler is to cool the air from return line 16 so that it gives up some of its moisture. A snap switch 19 is set to open at a selected fixed temperature set point between 120° F. and 150° if the temperature of the air exiting cooler 18 exceeds that fixed temperature.

A motor driven blower 20 provides the motive force to draw air through cooler 18 and force air under pressure through process air return line 22. The process air return line 22 has a process return branch 22a and a desiccant branch 22b.

As shown schematically in FIG. 1, a desiccant carousel 24 driven by a carousel motor 24a carries a desiccant tank 26 and associated piping 26a, a desiccant tank 28 and its associated piping 28a and desiccant tank 30 and its associated piping 30a. As is well known in the art, the carousel 24 rotates periodically to introduce a new desiccant tank into the drying system while the other tanks are being cooled and regenerated. As shown in FIG. 1, desiccant tank 26 and its associated piping 26a are included in the drying system loop in that air passing through the process return branch 22a passes through desiccant tank 26, through the associated piping 26a and into the process heater inlet line 32 At the same time, desiccant tank 28 is being cooled by air from cooler 18 that passes through the process air return line 22 and into the desiccant branch 22b from where it passes through desiccant tank 28, the associated piping 28a and into the warm air return line 34 that redirects it into cooler 18 through filter 18a.

A pressure switch 36 is connected across cooler 18 and filter 18a so that if the pressure across the cooler drops below a predetermined satisfactory pressure, the pressure switch will signal the low pressure which may occur because of a clogged filter 18a or problems with the cooler 18.

A temperature probe 38 is provided at the inlet to dryer hopper 10 so that the temperature of air entering the dryer hopper 10 can be determined for control of the system. A temperature snap switch 40 is provided on the process heater box. Snap switch 40 closes if the temperature reaches 500° F. so as to close down the system under such high heat.

The desiccant tank 30 and its associated piping 30a are positioned to be regenerated by the addition of heat to the desiccant tank from regeneration heater box 42. A motor driven blower 44 draws air through filter 46 and forces it into heated air line 48 from where it passes through the desiccant tank 30 and piping 30a to the regeneration air exit line 52. A temperature snap switch 50 is positioned on line 52 to open at a selected fixed temperature set point between 200° F. and 300° F. if its temperature reaches that fixed temperature. A temperature snap switch 51 positioned on the regeneration heater box 42 closes if the temperature at the heater box 42 reaches 500° F.

Figure 2:
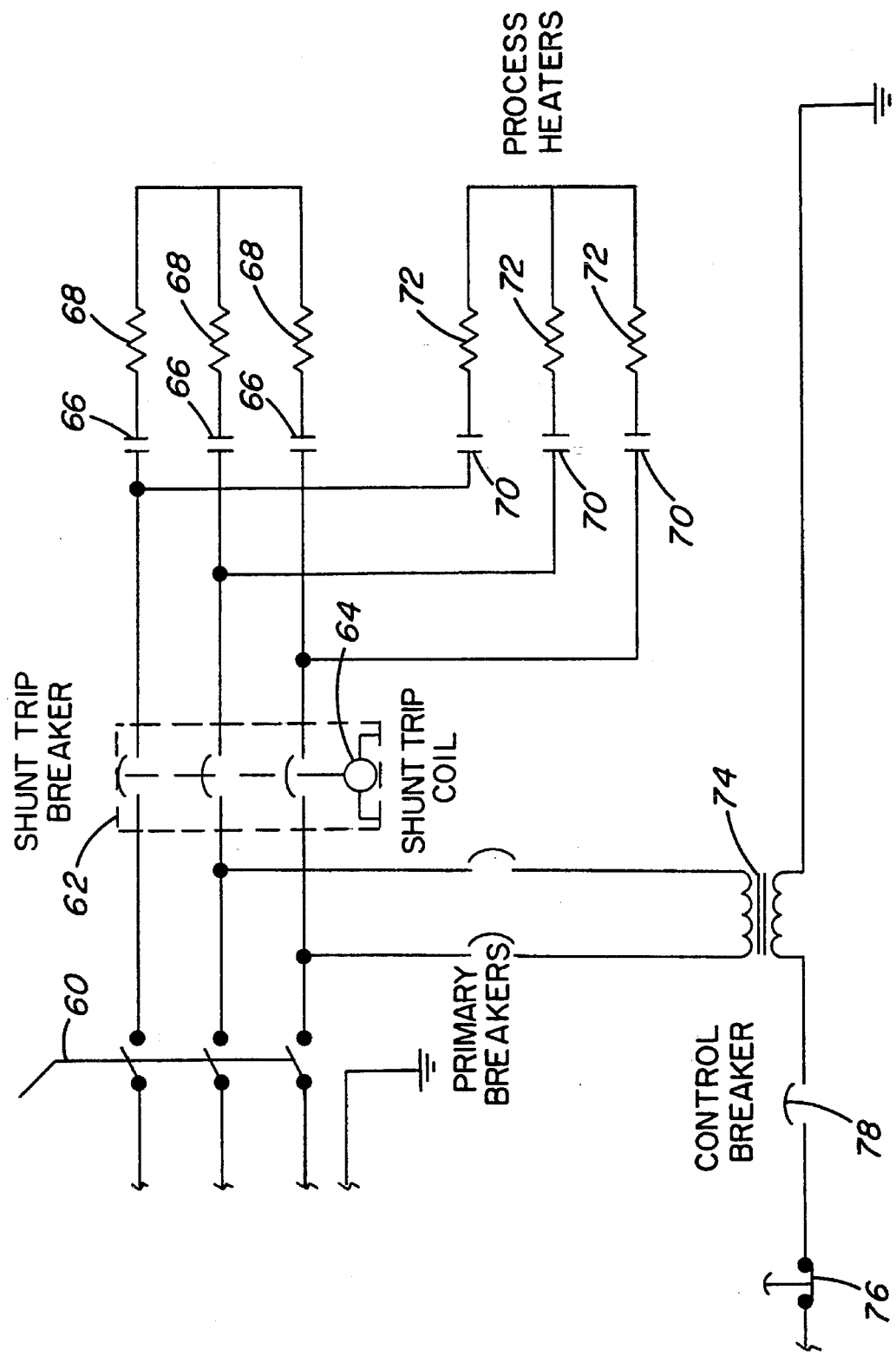
FIG. 2 is an electrical schematic wiring diagram of the power circuit of the present invention.

Referring now to FIG. 2, the power wiring diagram shows 3-phase A.C. voltage entering through a main disconnect 60. A shunt trip breaker 62 controlled by a breaker coil 64 normally permits power to pass through solid state relays 66 to regeneration heaters 68 located in regeneration box 42. In like fashion, power passes through solid state relays 70 to process heaters 72 located in process heater box 12. A transformer 74 steps down the incoming voltage to 120 volts for the control circuit. An emergency stop button 76 and breaker 78 permit opening of the control circuit.

Figure 3A:
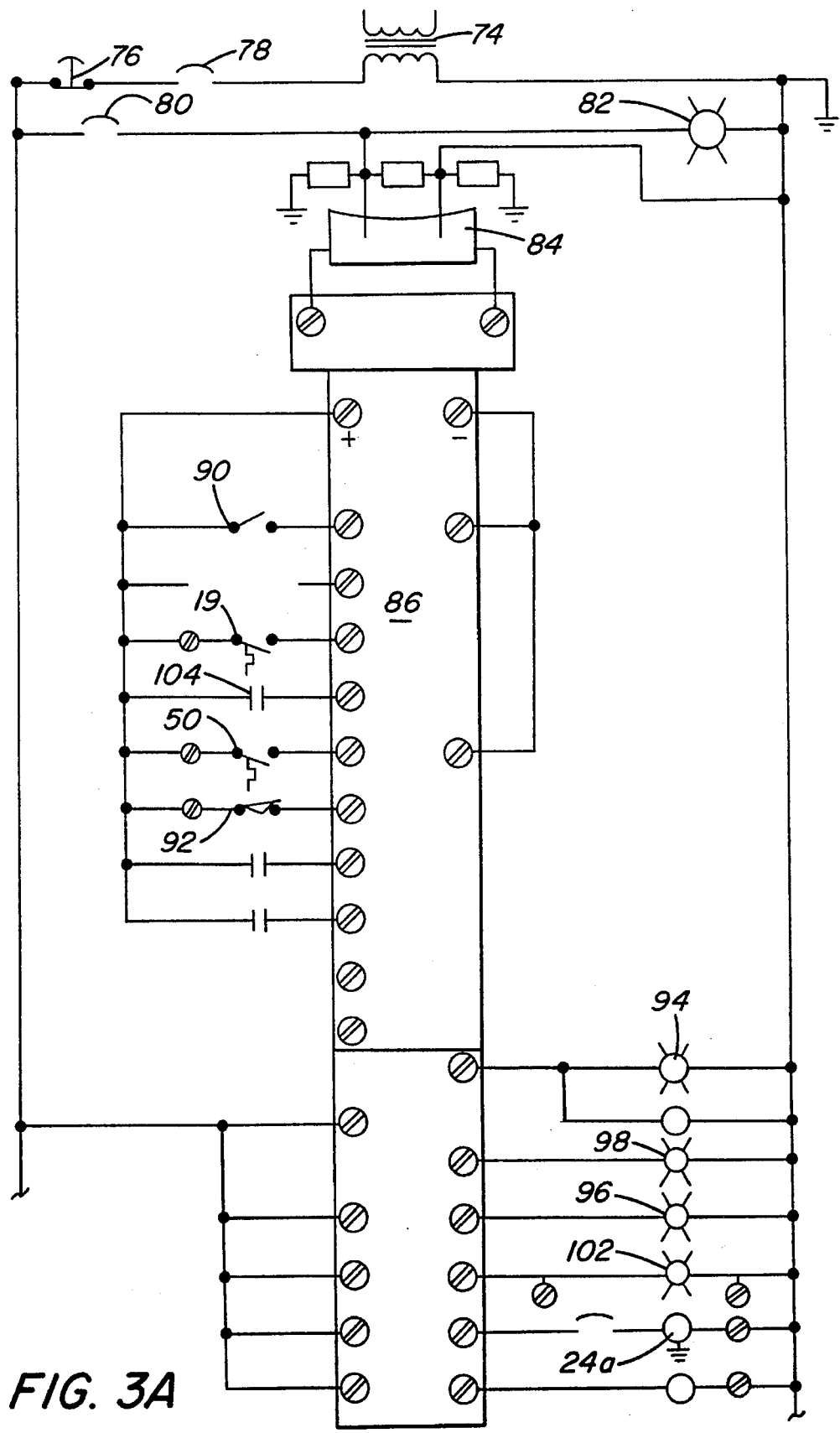
FIGS. 3A and 3B, taken together, are a schematic wiring diagram of the control circuit of the present invention.
Figure 3B:
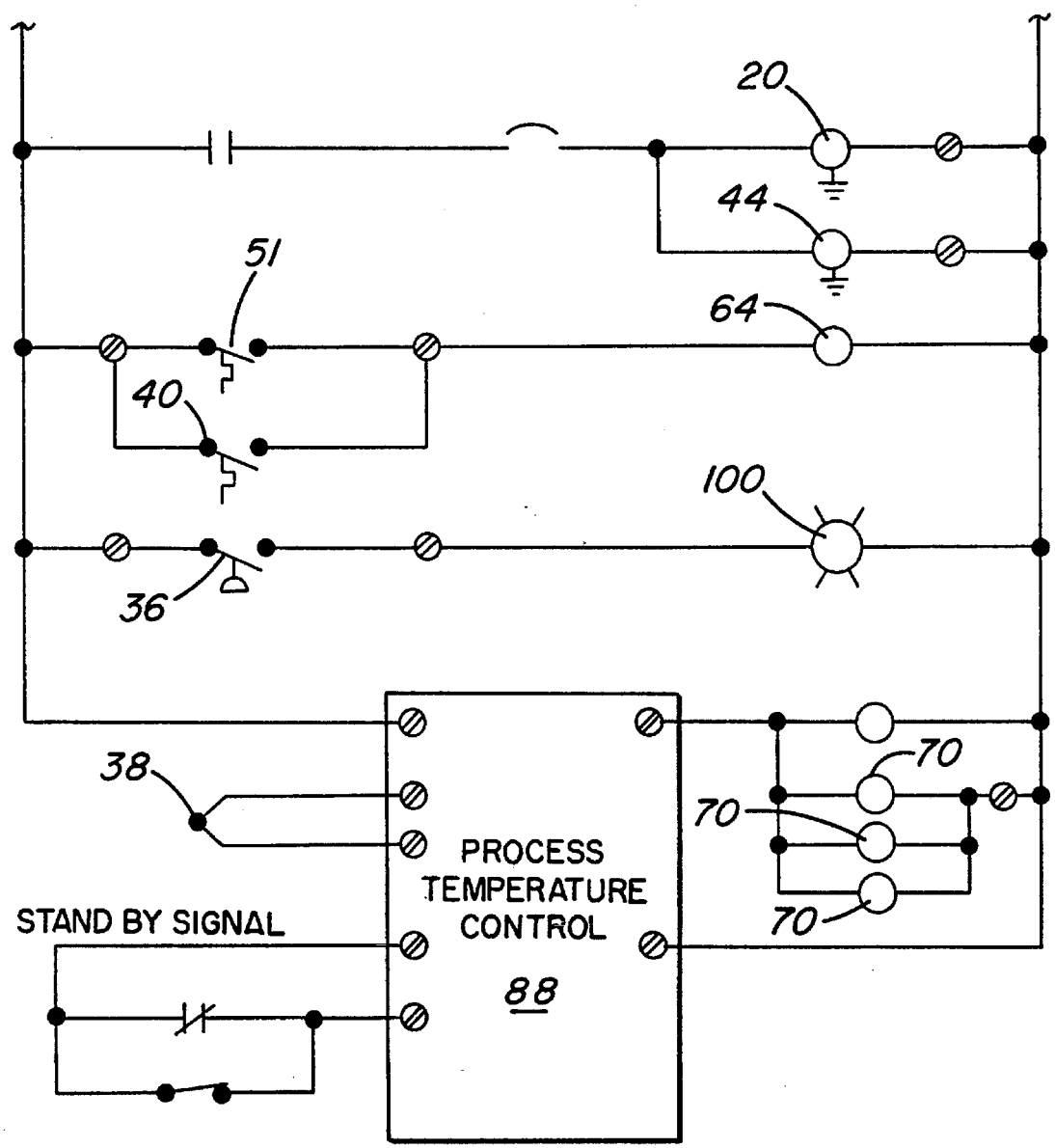

FIGS. 3a and 3b are a ladder diagram of the control circuit of the present invention. A breaker 80 when closed allows the power light 82 to be activated to show that the control circuit is operational. A line filter 84 provides noise-free 120 volt A.C. input to the programmable logic controller 86 manufactured by the Allen Bradley Company. The programmable logic controller 86 together with the temperature controller 88 manufactured by Eurotherm Controls provide the basic controls for the dryer control system of the present invention. A drying mode switch 90 is positioned to the drying position to begin operation of the dryer. A limit switch 92 is provided to control the regeneration of the desiccant as will be described. A process enabling light 94 remains activated so long as the process may proceed.

A process temperature fault light 96, a regeneration system fault light 98 and an air flow fault light 100 are all provided in the circuitry to indicate various faults that may occur as control of the dryer proceeds. Each of the fault lights 96, 98 and 100 are a yellow light. It will be understood that all of the lights referred to in the description of the ladder diagram of FIG. 3A and 3B are mounted on a control panel readily visible to the operator of the dryer. In similar fashion, a red alarm light 102 is provided to signal the more serious alarm condition.

In operation of the dryer control system, the main disconnect 60 is turned on and power passes through the normally closed breaker 62 and the programmable logic controller 86 and the temperature controller 88 as well as the power light 82 are energized. At this same time the drying mode switch 90 is positioned to the "shut-down" position.

Once the drying mode switch 90 is placed in the drying position, a drying sequence begins. The process motor driven blower 20, the regeneration motor driven blower 44 and the process enabling light 94 are continuously energized until a shut-down alarm occurs or until the drying sequence is manually terminated. The temperature controller 88 begins cycling the process heaters 72 to control the process delivery air temperature by means of the temperature probe 38. The desiccant tank 26 that is in the process line receives air under pressure from motor driven blower 20 which passes through the desiccant tank 26 to remove moisture from the air and then moves to the process heater box 12. Heated process air is moved through the drying hopper 10 where it passes the temperature probe 38 at the inlet of the drying hopper 10. The temperature probe 38 signals the temperature controller 88 to turn on or turn off the process heaters 72 within the heater box 12 to maintain the correct process temperature.

The process air returns from the drying hopper 10 to the motor driven process blower 20 through the return air cooler 18 and filter 18a to start the process cycle over. The programmable logic controller 86 controls the regeneration heaters 68 on a time basis. There is a temperature snap switch 50 in the regeneration exhaust line 52 to monitor the temperature in line 52 to signal when the temperature has reached a selected fixed temperature between 200° F. and 300° F. Snap switch 51 monitors the heater's condition in the regeneration heater box 42 and prevents the heater box temperature from exceeding 500° F. After approximately fifteen to thirty minutes, the carousel drive motor 24a is energized and the index switch 92 input is opened when the desiccant carousel 24 begins to turn. When the index switch 92 recloses, the carousel drive motor 24a is deenergized and the approximately fifteen to thirty minute timing cycle is started again.

When the drying mode switch 90 is placed in the "shut-down" position, the heaters 72 and 68 are turned off and the motor driven blowers 20 and 44 stay running for a predetermined time to allow the heater boxes 12 and 42 to cool down. When the motor driven blowers 20 and 44 shut down, the process enabling light 94 is deenergized. The emergency stop button 76 may be utilized to open the 120 volt control circuit.

As is summarized in FIG. 4, there are two types of alarms. Passive alarms activate only the process temperature fault light 96, the regeneration system fault light 98, and the air flow fault light 100 while maintaining the dryer control system in operation. Shut-down alarms activate only the red alarm light 102 or a combination of the alarm light 102 and one of the yellow caution lights 96, 98 or 100. Shut-down alarms will stop the drying sequence and turn off the motor driven blowers 20 and 44, the heaters 72 and 68, and the process enabling light 94. The passive alarms permit the control system to continue to operate while giving the operator an indication of an abnormal condition in the system. The active shut-down alarm causes the system to cease operation so that no damage can be done as a result of the more serious fault resulting in a shut-down alarm.

When the temperature fault light 96 is activated by itself, the return air temperature is higher than recommended for taking the moisture out of the process air. Return air temperature is monitored with temperature snap switch 19 located in the process return air line 22. When the temperature fault alarm occurs, the system must be allowed to cool. Once the temperature drops back down to a satisfactory level, the temperature fault light 96 will deenergize. If the temperature fault light 96 is energized with the alarm light 102, the process temperature has exceeded the high/low deviation alarm band. This alarm signal is controlled by the temperature controller 88 which signals the programmable logic controller 86 to energize the alarm light 102 and shut-off the system.

The regeneration fault light 98, if activated by itself, indicates the regeneration exhaust temperature snap switch 50 tripped too soon or the switch 50 never tripped during the desiccant tank's regeneration cycle. If the switch tripped too soon, the desiccant tank 30 in the regeneration position may be low on desiccant. If the switch 50 never trips, the desiccant within tank 30 is contaminated, the regeneration filter 46 needs to be replaced, or the heaters 68 or regeneration motor driven blower 44 has failed. If the regeneration fault light 98 and the alarm light 102 are both energized, the rotating carousel 24 did not index to the next desiccant tank in the proper time allotted. This indicates a defective carousel drive motor 24a or a misaligned index switch 92.

When the air flow fault light 100 is energized by itself, the air flow has been reduced and the process cooler filter 18a usually needs cleaned. This condition occurs because pressure switch 36 which monitors pressure loss across the return air filter 18a in the cooler 18 has been activated. There is no situation where the control system should shut-down with this flow light 100 energized along with the alarm light 102.

If the alarm 102 is energized and no caution lights 96, 98 or 100 are energized, it indicates that one or both of the high temperature snap switches 51 or 40 have closed. When this fault occurs, the high temperature snap switches 51 or 40 energize the breaker coil 64 which trips the shunt trip breaker 62 and breaks the three phase power to heaters 72 and 68. The shunt trip breaker 62 also has an auxiliary contact 104 which gives the programmable logic controller (86) an input to stop the drying cycle. To restart the drying cycle, the drying mode switch 90 is positioned to the "shut-down" position until the snap switches 51 and 40 cool. The drying cycle is then restarted by resetting the shunt trip breaker 62.

The control system of the present invention provides a number of fault warnings and alarm warnings which can be interpreted by the operator of the dryer. The fault warnings, by themselves, do not cause shut-down of the drying cycle. They indicate that a problem may exist and may be corrected while the drying cycle continues. An alarm, on the other hand, will cause the drying cycle to be interrupted because it presents a danger to the equipment or operator. Once an alarm situation is activated, the drying cycle will stop until the situation which caused it is corrected.

Three of the requirements for effective drying of plastic pellets are insured by the present invention. The process air flow is guaranteed by providing pressure warnings if the flow is reduced. The dewpoint of the drying air is controlled by the regeneration temperature of the desiccant tanks. The process temperature is controlled by the process temperature probe.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A dryer control system for controlling the drying of plastic pellets within a dryer hopper comprising:

a process heater box for heating air to be introduced into said dryer hopper, said process heater box including a first snap switch which closes upon reaching a predetermined high temperature;

a temperature probe positioned to determine the temperature of air entering said dryer hopper;

a return air line to return air from said dryer hopper through a filter, a cooler, a motor driven blower, and a desiccant tank to said process heater;

a programmable logic controller;

a temperature controller;

said temperature probe signalling said programmable logic controller and said temperature controller to maintain a preselected temperature of the heated air leaving said heater box, and said first snap switch causing said control system to shut-off if said heater box becomes overheated.

2. The dryer control system of claim 1 wherein said first snap switch closes when the temperature of said snap switch reaches 500° F.

3. The dryer control system of claim 1 wherein the closing of said first snap switch activates an alarm light signalling that the system has shut-down.

4. A dryer control system for controlling the drying of plastic pellets within a dryer hopper comprising:

a process heater box for heating air to be introduced into said dryer hopper, said process heater box including a first snap switch which closes upon reaching a predetermined high temperature;

a temperature probe positioned to determine the temperature of air entering said dryer hopper;

a return air line to return air from said dryer hopper through a filter, a cooler, a motor driven blower, and a desiccant tank to said process heater;

multiple desiccant tanks to permit cooling and regeneration of said desiccant tanks not being utilized to dry process air;

a desiccant regeneration heater box for heating air to regenerate said desiccant tanks including a second snap switch that closes upon reaching a predetermined high temperature;

a programmable logic controller;

a temperature controller;

said temperature probe signalling said programmable logic controller and said temperature controller to maintain a preselected temperature of the heated air leaving said process heater box, and said first snap switch and said second snap switch causing said control system to shut-off if either of said snap switches closes.

5. The dryer control system of claim 4, wherein said first snap switch and said second snap switch each close when the temperature of said snap switches reaches 500° F.

6. The dryer control system of claim 4 wherein the closing of either said first snap switch or said second snap switch activates an alarm light signalling that the system has shut-down.

7. The dryer control system of claim 4 wherein said desiccant tanks are mounted on a desiccant carousel so that said tanks may be rotated between a position in the process cycle and positions in the regenerator phase.

8. The dryer control system of claim 4 wherein said programmable logic controller and said temperature controller are each off-the-shelf items that may be purchased for use in said dryer control system.

9. A dryer control system for controlling the drying of plastic pellets within a dryer hopper comprising:

a dryer hopper having a hot air inlet in the lower portion and an air outlet in its upper portion;

a process heater box to supply heated air to said hopper hot air inlet;

a cooler with a cooler filter to receive air from said hopper air outlet;

a desiccant carousel carrying at least three desiccant tanks and being rotatable to selectively position a first desiccant tank in communication with said cooler and said process heater, to selectively position a second desiccant tank in communication with said cooler only, and to selectively position a third desiccant tank in communication with a desiccant regeneration heater box;

a desiccant regeneration heater box to supply heated air for regenerating said desiccant tanks;

a programmable logic controller;

a temperature controller;

a plurality of passive fault warning lights;

an alarm warning light;

a plurality of temperature snap switches mounted on components of said system;

a temperature probe mounted on the air line delivering heated air from said process heater box to said dryer hopper hot air inlet;

a limit switch mounted on said desiccant carousel a pressure switch mounted across said cooler and said cooler filter;

said programmable logic controller and said temperature controller receiving signals from said snap switches, said temperature probe, said pressure switch and said limit switch to activate one or more of said passive fault warning lights if a fault exists in the operation of said system which does not require shut-down of said system and to activate said alarm light and to shut-down said system if a serious fault exists.

10. The dryer control system of claim 9 wherein one of said plurality of temperature snap switches is fixed to said process heater box and closes when the temperature of said snap switch reaches 500° F. thereby triggering a shut-down alarm and activating said alarm light.

11. The dryer control system of claim 9 wherein one of said plurality of temperature snap switches is fixed to said desiccant regeneration heater box and closes when the temperature of said snap switch reaches 500° F. thereby triggering a shut-down alarm and activating said alarm light.

12. The dryer control system of claim 9 wherein an excessively high reading of said temperature probe triggers a high temperature passive fault warning light and a shut-down alarm and also activates said alarm light.

13. The dryer control system of claim 9 wherein failure of said desiccant carousal to move to the correct position activates said limit switch to trigger a regeneration passive fault warning light and a shut-down alarm and also activates said alarm light.

14. The dryer control system of claim 9 wherein one of said plurality of temperature snap switches is fixed to the line which removes air from said cooler and opens when the temperature of said snap switch reaches a set point between 120° F. and 150° F. thereby triggering a high temperature passive fault warning light only.

15. The dryer control system of claim 9 wherein one of said plurality of temperature snap switches is fixed to the line which removes regeneration air from said third desiccant tank and opens when the temperature of said snap switch reaches a set point between 200° F. and 300° F. thereby triggering a regeneration passive fault warning light only.

16. The dryer control system of claim 9 wherein said pressure switch mounted across said cooler and said cooler filter causes activation of an air-flow passive fault light only when said pressure switch senses a pressure above a preselected pressure.

17. The dryer control system of claim 9 wherein said plurality of passive fault warning lights includes a high temperature fault warning light, a regeneration fault warning light and an air flow fault warning light.

18. The dryer control system of claim 9 wherein said plurality of temperature snap switches includes a snap switch fixed to said process heater box and a snap switch fixed to said desiccant regeneration heater box.

19. The dryer control system of claim 9 wherein said desiccant carousel is driven by a carousel drive motor to position said desiccant tanks.

20. The dryer control system of claim 9 wherein said dryer hopper is a vertical cylindrical tank having a frustoconical lower portion.

* * * * *